United States Patent [19]

Richwine et al.

[11] Patent Number: 5,779,968
[45] Date of Patent: Jul. 14, 1998

[54] SPORTS BALL BLADDER AND METHOD OF MANUFACTURE

[75] Inventors: John Robert Richwine, Medina; Ostin H.C. Tan, Copley, both of Ohio; Purushottam Das Agrawal; Tiong Boon Seet, both of Singapore, Singapore; Kevin Mark Gase, Bay Village, Ohio

[73] Assignee: Advanced Elastomer Systems, L.P., Akron, Ohio

[21] Appl. No.: 697,302

[22] Filed: Aug. 22, 1996

[51] Int. Cl.$^6$ ................................. B29C 49/20
[52] U.S. Cl. ................ 264/515; 264/516; 473/610; 29/453
[58] Field of Search ................ 264/515, 516, 264/536; 473/593, 603, 604, 610, 611; 29/890.122, 890.127, 899.1, 453

[56] References Cited

U.S. PATENT DOCUMENTS

| | | | |
|---|---|---|---|
| 1,388,123 | 8/1921 | Roberts | 364/516 |
| 2,295,804 | 9/1942 | Olson | 473/610 |
| 2,405,149 | 8/1946 | Kempthorn | 473/604 |
| 2,509,882 | 5/1950 | Roberts | 264/516 |
| 3,411,974 | 11/1968 | Jone-Hinton et al. | 473/604 |
| 4,277,300 | 7/1981 | Taluba et al. | 264/516 |
| 4,340,222 | 7/1982 | Kerkenbush et al. | 473/610 |
| 5,033,498 | 7/1991 | Brandt | 137/223 |
| 5,294,112 | 3/1994 | Smith | 273/58 BA |

OTHER PUBLICATIONS

Derwent Abstract, Japanese Patent Application 54–093061.

Primary Examiner—Catherine Timm
Attorney, Agent, or Firm—Ralph E. Jocke; Michael C. Pophal; William A. Skinner

[57] ABSTRACT

A sports ball bladder and method of manufacture which produces a sports ball in which a valve element (48) is fused to the bladder and is disposed away from a parting line (40) of a mold (34). The bladder is made by extruding a parison (64) and closing a mold cavity (42) in surrounding relation thereof. A blow needle (46) supports the valve element thereon and delivers fluid pressure to an interior area (68) of the parison. The expanding parison fills the mold cavity and impinges on the valve element. The expanded parison is cooled to solidify the thermoplastic material. The pressure in the interior area is then relieved through the blow needle and the mold is opened. To avoid thinning of the bladder adjacent to the parting line, thermoplastic material is pushed inwardly into the mold cavity from a pinch pocket (80) as the mold is closed. After the ball bladder is formed, a valve member (72) is inserted into the valve element to enable holding of the bladder in an inflated condition.

19 Claims, 6 Drawing Sheets

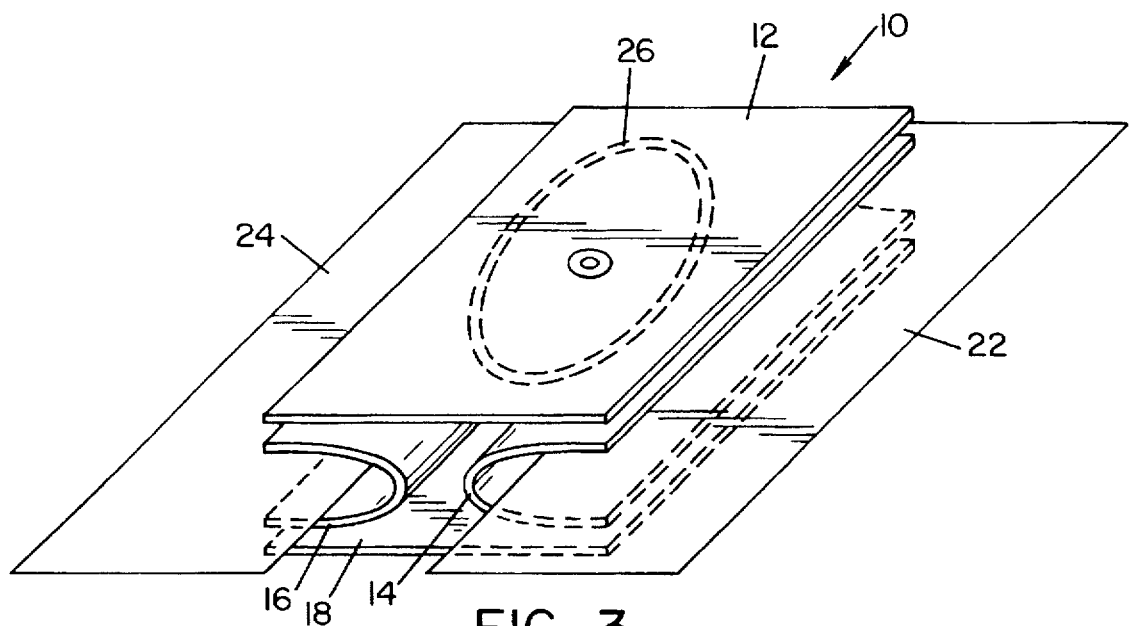
FIG. 3
(PRIOR ART)
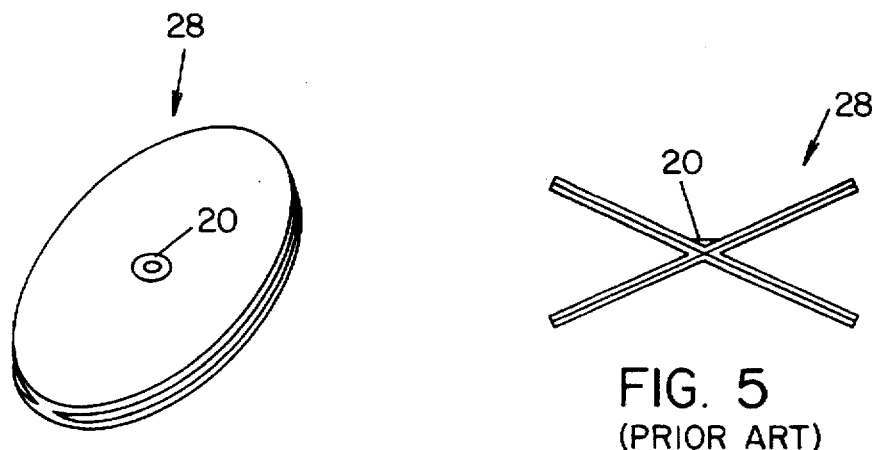
FIG. 4
(PRIOR ART)
FIG. 5
(PRIOR ART)
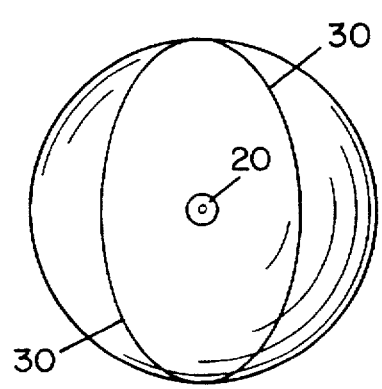
FIG. 6
(PRIOR ART)

SPORTS BALL BLADDER AND METHOD OF MANUFACTURE

TECHNICAL FIELD

This invention relates to bladders used in sports or recreational balls. Specifically this invention relates to an inflatable bladder and a method of making the bladder for a sports ball and a method for making a sports ball.

BACKGROUND ART

Sports balls, particularly those that are inflatable, generally include an internal bladder for holding air under pressure. Examples of sports balls which include bladders are volleyballs, footballs, basketballs, soccer balls, rugby balls and tennis balls. In many cases the sports balls have an outer cover which overlies the inflatable bladder. In other cases the outer surface of the bladder is the outer ball surface.

Sports ball bladders generally include a valve thereon. The valve enables inflating the bladder and replenishing the air pressure in the bladder when required. Common ball bladders use a generally closed slit type valve that is generally closed to maintain the air pressure in the bladder. A valve needle connected to a pump may be inserted through the valve slit to deliver air into the bladder. Upon removal of the valve needle the valve is again closed.

Sports ball bladders have traditionally been made from thermoset rubber. The manufacture of sports ball bladders has generally been done by a splicing method. The splicing method of making bladders is shown in FIGS. 1–6.

The construction of a sports ball bladder by the splicing method is begun by laying out a segment assembly generally indicated 10 in FIG. 1. A first segment 12 of thermoset rubber is placed above two side segments 14 and 16. Side segments 14 and 16 are folded back upon themselves as shown. A further segment 18 of similar material is placed below the folded side segments. As shown schematically in FIG. 1, first segment 12 includes a valve assembly 20 thereon. Valve assembly 20 is a conventional sports ball bladder valve. Valve 20 is held in an opening in first segment 12 with an adhesive.

The next step in the splicing method of forming the ball bladder is demonstrated in FIG. 2. A first thin steel sheet 22 is extended in the fold of side segment 14. Similarly a second thin steel sheet 24 is inserted in the fold of side segment 16. Sheets 22 and 24 are extended to the full depth of the folds. It should be understood that although the segment assembly 10 is shown in FIG. 2 in an exploded view, in practice the assembly is compressed and the folds of side segments 14 and 16 extend to about the center of the segment assembly.

The next step in forming a ball bladder by the splicing method is graphically shown in FIG. 3. The segment assembly with sheets 22 and 24 thereon is compressed between heated dies in a splicing press. The heated dies have projections which define a splice line 26. The segment assembly is pressed between the heated dies so that segments 12, 14, 16 and 18 fuse together along a projection of splice line 26 that extends vertically through the entire segment assembly. It should be understood that in the splicing press segments 12 and 18 are covered by a protective sheet to prevent damage thereto by direct contact with the heated dies. The thin steel sheets 22 and 24 prevent the folded side segments from fusing to themselves along the splice line in the areas of the folds.

The next step in forming a ball bladder by the splicing method is shown in FIG. 4. The thin steel sheets are removed from engagement with side segments 14 and 16. The excess material outside the splice line 26 is trimmed leaving a collapsed bladder 28 as shown in FIG. 4. In this stage the bladder 28 appears from the side as generally shown in FIG. 5.

Bladder 28 is then placed in a vulcanization oven to cure the joined thermoset rubber material to a finished bladder. After curing, the bladder is inflated by passing air through the valve assembly 20 so that the bladder assumes the configuration shown in FIG. 6. As can be appreciated from the foregoing description of the splicing method, the finished bladder includes seams 30 which extend about the bladder periphery. The seams 30 are formed where the segments are fused together. Such seams present potential weak points on the bladder which may be susceptible to rupture or failure. Likewise the valve assembly 20, which is held to the bladder by adhesive, presents a further area that may be susceptible to rupture or failure.

The splicing method of forming ball bladders includes the several process steps previously described. Because of the number of steps the process is time-consuming and costly. In addition, the substantial number of operations increases the possibilities for defects.

Sports ball bladders have also been constructed in the prior art using a radio frequency (RF) welding method. This method uses flat sheets of a polyurethane and polyvinyl chloride blend. A valve is initially welded to a sheet in which a hole has been die cut. The valve is RF welded to the edges of the cut hole. The sheet is then RF welded to other sheets forming the bladder.

This prior art method of manufacturing bladders suffers from many deficiencies which results in unacceptable gas leakage rates from the bladder. The polyurethane sheets are attached by hydrolysis. The degradation of the polyurethane results in increased gas permeability in the sheets comprising the bladder. This degradation adds to the inherently high gas permeability of polyurethane.

The RF welding method also produces a thick seam which weighs more than other areas of the sports bladder. These thick seams can create an eccentric center of gravity within the sports ball, which results in poor performance of the sports bladder.

Thus there exists a need for a sports ball bladder and a method of manufacture thereof which is faster, more reliable and less expensive.

DISCLOSURE OF INVENTION

It is an object of the present invention to provide a sports ball bladder.

It is a further object of the present invention to provide a sports ball bladder that does not include splices.

It is a further object of the present invention to provide a sports ball bladder that is resistant to wear and which has a low net gas permeability.

It is a further object of the present invention to provide a sports ball bladder that is manufactured more rapidly and at a lower cost.

It is a further object of the present invention to provide a method for making a sports ball bladder.

It is a further object of the present invention to provide a method for making a sports ball bladder by blow molding a thermoplastic material using an insert.

It is a further object of the present invention to provide a method for making a sports ball bladder that produces a strong and durable bladder.

It is a further object of the present invention to provide a method for making a sports ball bladder that includes only a small number of method steps.

It is a further object of the present invention to provide a method for making a sports ball bladder that minimizes the number of weld lines on the bladder.

It is a further object of the present member to provide a sports ball bladder which is shaped to conform with a sports ball shell.

It is a further object of the present invention to provide a method for making a sports ball bladder that may be used to produce bladders reliably, quickly and economically.

Further objects of the present invention will be made apparent in the following Best Modes for Carrying Out Invention and the appended claims.

The foregoing objects are accomplished in a preferred embodiment of the invention by a method for making a sports ball and a ball bladder produced by such method. The ball bladder is produced by blow molding a plastic material in a mold. The mold has a cavity which is bounded by a cavity wall which defines the shape of the bladder. The mold includes two separable mold pieces which are separated and brought together along a parting line.

In the preferred form of the invention a blow needle movably extends through one of said mold pieces. The blow needle is disposed from the parting line. The blow needle is connected through appropriate valving to a source of compressed fluid, preferably air. The valving enables compressed air to be delivered into the mold cavity through the blow needle, and to be selectively exhausted through the blow needle to atmosphere.

A valve insert preferably comprised of elastomer material includes a central passage therethrough. With the mold pieces separated, the blow needle is inserted and extended through the central passage of the valve element. As a result the valve element is supported on the blow needle in the mold cavity.

In the method of making a ball bladder of the preferred embodiment of the present invention, a generally cylindrical parison of thermoplastic material is extruded so as to extend between the separated mold pieces. The parison includes a hollow interior area.

The parison is sized so that the lay flat diameter of the parison extending between the mold pieces exceeds the diameter of the mold cavity. The mold pieces are then closed. As a result a portion of parison extends through the mold cavity and the remainder is pinched off by the closing of the mold. The blow needle extends inwardly in the mold cavity so its opening is in the interior area of the parison. Fluid pressure is then applied in the interior area. The fluid pressure causes the parison to expand outwardly and impinge against the wall of the mold cavity and against the valve element. The composition of the valve element is such that the impingement of the expanding parison thereon bonds the parison and the valve element together.

The expanded parison which assumes the shape of the mold cavity is cooled in the mold to solidify the thermoplastic material. As the thermoplastic material solidifies, fluid pressure continues to be applied to the interior area of the parison through the blow needle.

After sufficient cooling and solidification of the thermoplastic material, the condition of the valving to the blow needle is changed to relieve pressure from the interior area. The mold pieces are again separated and the bladder is removed.

In the preferred form of the invention the mold includes a continuous pinch pocket in surrounding relation of the mold cavity adjacent to the parting line of the mold. When the mold pieces are closed to surround the parison, the pinch pockets are pressed so as to push additional thermoplastic material into the mold cavity at the parting line. This results in the bladder having additional strength and gas permeability resistance at the parting line which might otherwise be a weak point of the bladder.

After removal of the bladder from the mold a valve member is installed in the central passage of the valve element. This valve member enables the bladder to be inflated and to retain air pressure therein.

The completed ball bladders may be used as sports balls without further processing. Alternatively, the completed ball bladders may be fitted with a suitable cover so as to produce a desired type of sports ball.

BRIEF DESCRIPTION OF DRAWINGS

FIG. 3 is a segment assembly similar to FIG. 2 and showing the splice line produced by a splicing press which fuses the segments into connected relation.

FIG. 4 is an isometric view of a collapsed bladder made in accordance with the prior art splicing method after trimming excess material.

FIG. 5 is a side view of the collapsed bladder shown in FIG. 4.

FIG. 6 is a plan view of an inflated bladder made in accordance with the prior art splicing method.

BEST MODES FOR CARRYING OUT INVENTION

Figure 1:
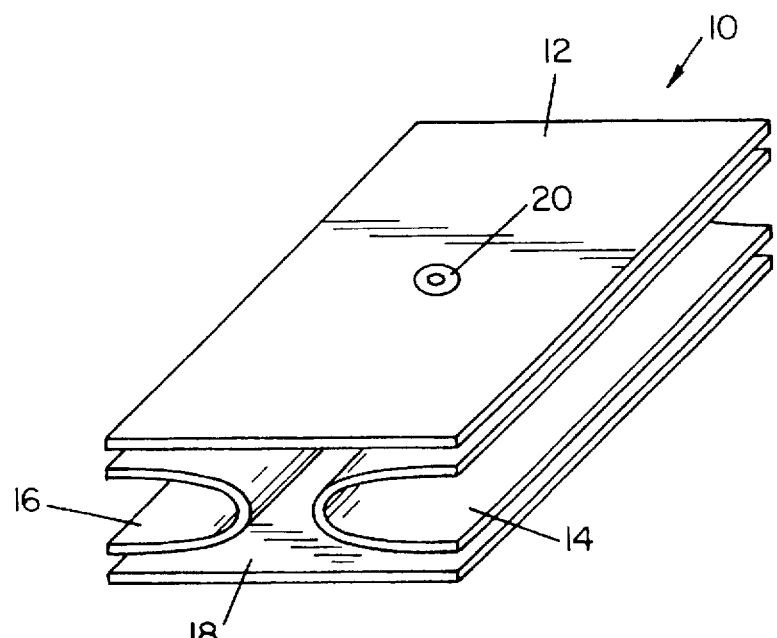
FIG. 1 is an isometric exploded view of a segment assembly used in the manufacture of sports ball bladders by the prior art splicing method.
Figure 2:
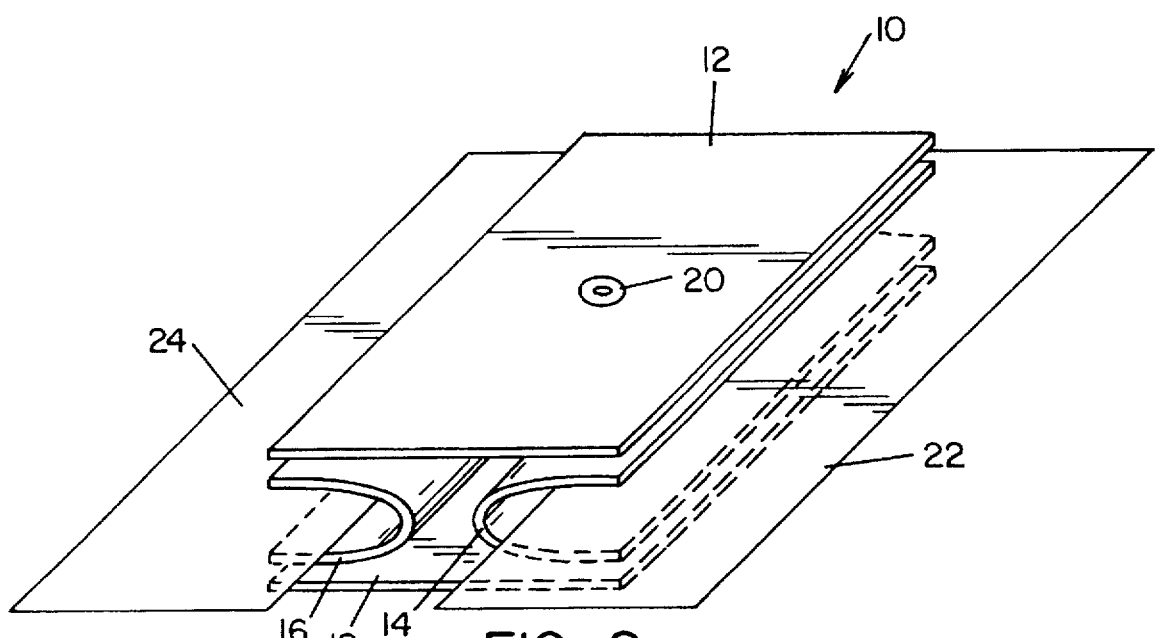
FIG. 2 is a view similar to FIG. 1 of a segment assembly with thin steel sheets inserted in the side segments.
Figure 7:
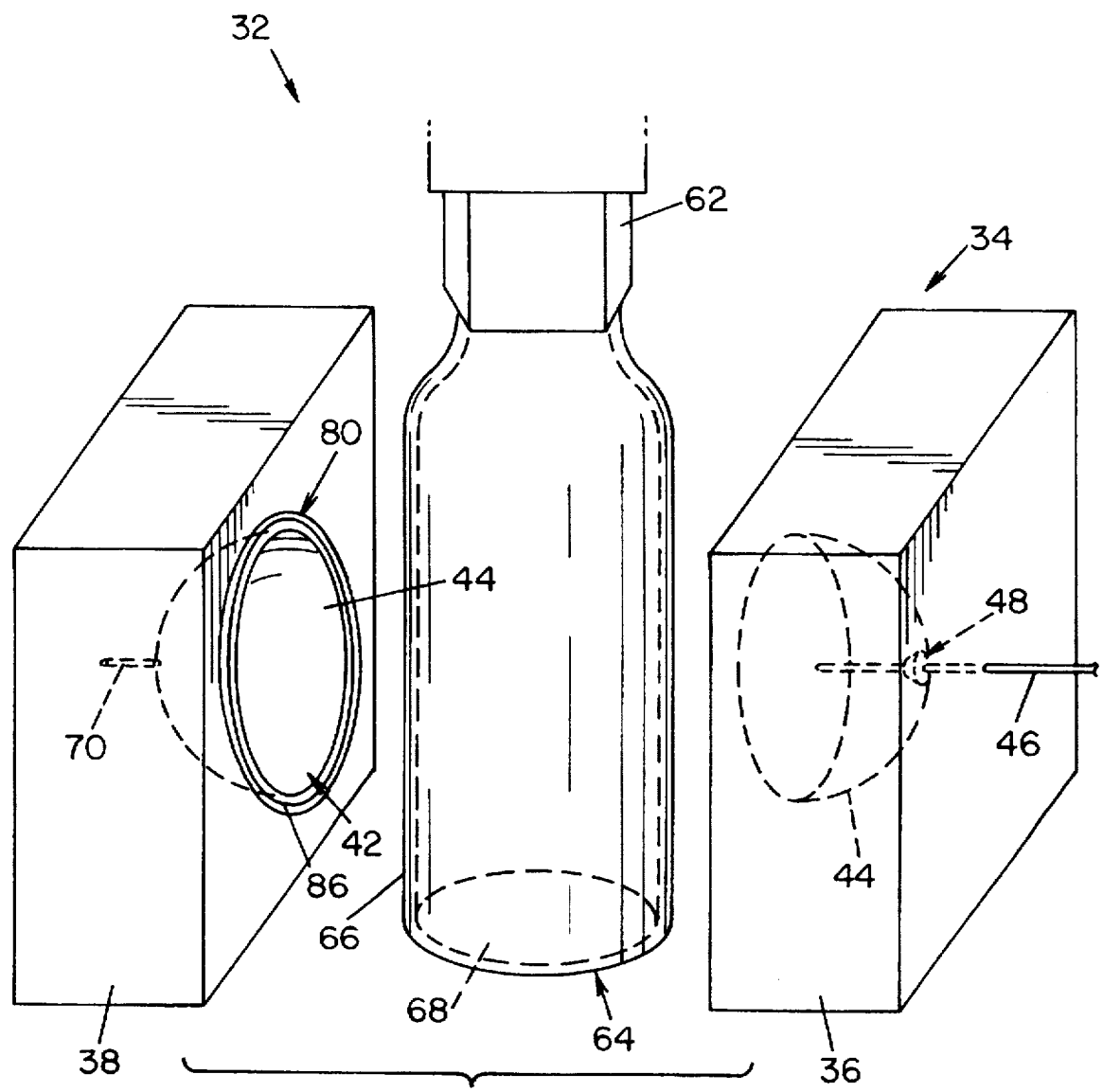
FIG. 7 is an isometric schematic view showing the separable mold pieces, valve element and blow needle used in a preferred embodiment of the method of the present invention and a parison extending from an extruder head, with the parison extending between the separated mold pieces.

Referring now to the drawings and particularly to FIG. 7, there is shown therein a blow molding apparatus generally indicated 32 for making a ball bladder and for carrying out a method of a preferred embodiment of the present invention. Apparatus 32 includes a mold generally indicated 34. Mold 34 includes a first separable mold piece 36 and a second mold piece 38. Mold pieces 36 and 38 are separable generally along a parting line 40 (See FIG. 8). The mold pieces 36 and 38 are preferably made of high heat conductive aluminum and include water cooling chambers throughout to selectively draw heat from the surface of the mold.

A cavity 42 extends in mold 34. Cavity 42 is bounded by a cavity wall 44 which defines the shape of a particular ball bladder manufactured in the mold. In the embodiment of the invention shown in FIG. 7, cavity 44 is configured for producing a generally spherical bladder. In should be understood that the present invention encompasses and may be used to produce bladders of various shapes.

A blow needle 46 is movably supported on mold piece 36 and extends inwardly into the cavity from cavity wall 44. Blow needle 46 is a conventional type of blow needle used in blow molding processes and it may be of either the end or side opening types. It will be understood by those skilled in the art that blow needle 46 may be movable relative to mold piece 36 using a conventional blow needle moving mechanism. Alternatively, the blow needle may be mounted in fixed relation on mold piece 36.

Blow needle 46 is connected through conventional valving to a source of compressed air or other pressurized fluid. The valving attached to blow needle 46 may be selectively actuated to deliver pressurized fluid out the opening(s) at the end of the blow needle, and to alternatively enable fluid to flow from the opening(s) at the end of the blow needle to atmosphere.

A fundamental aspect of the present invention is that the blow needle can extend in the mold cavity at any location disposed from the parting line of the mold. Blow needle 46 preferably supports a valve element 48 thereon during the method of manufacture of the ball bladder. Positioning the valve element 48 and the blow needle away from the parting line in the mold cavity produces a stronger and more durable ball bladder by maintaining the area of attachment of the valve element to the remainder of the bladder away from the parting line.

The area of a blow molded article adjacent a parting line of a mold has traditionally experienced thinning as the result of inherent characteristics of the blow molding process. Because the area of such a blow molded article adjacent the parting line of the mold is thinner than the remainder of the article, it may be a weak point where failure may occur. The attachment of a separate body to a blow molded article in the area adjacent the parting line presents additional chances for the development of weak points and failure. This is because such a separate body will have different heat transfer properties and characteristics from the surrounding material. It is for this reason that in ball bladders of the invention the valve body is disposed away from the parting line of the mold.

Figure 11:
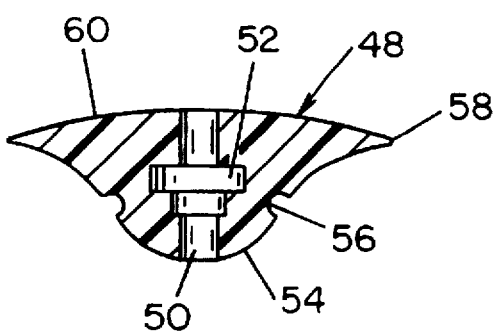
FIG. 11 is a side cross sectional view of a valve element used in a preferred embodiment of the sports ball bladder and method of the present invention.

Valve element 48 is shown in greater detail in FIG. 11. Valve element 48 includes a central passage 50 that extends longitudinally therethrough. Central passage 50 is sized to enable blow needle 46 to extend therethrough and so that valve element 48 is movable on the blow needle. Central passage 50 further includes an enlarged pocket 52 therein.

Valve element 48 includes a projecting portion 54 which extends inwardly in the mold cavity during the blow molding process of making the sports ball bladder. Valve element 48 further includes an annular radially extending lip 58. Annular lip 58 extends radially outward relative to projecting portion 54.

Valve element 48 further includes an outer surface 60. Outer surface 60 has a radiused contour as shown. Outer surface 60 is configured to conform to the configuration of the wall portion of the mold cavity adjacent to where the blow needle extends in the mold cavity. In the form of the valve element shown the contour of outer surface 60 conforms to the radiused surface of the cavity wall and the inflated contour of the ball bladder to be produced. Of course in other embodiments, the outer surface may have other contours to conform with the particular ball bladder manufactured.

Projecting portion 54 includes an annular recess 56. The annular recess 56 acts to increase the surface area on the valve element which will bond with the expanding parison. The annular recess also acts to interrupt the propagation of any tears in the ball bladder which occur on the ball bladder to valve interface. The valve element 48 can alternatively include a plurality of annular recesses which act to increase the surface area on the valve element. The multiple annular recesses also provide a surface texture to the outer surface of the valve element which aids in the adhesion of the expanding parison to the outer surface 60. The multiple annular recesses also provide multiple tear propagation interruptions which effectively stop any tear propagations originating at the interface of the ball bladder and the projecting portion.

Referring again to FIG. 7, in the method of making the ball bladder of the preferred embodiment of the present invention an extruder head 62 is used to extrude a parison 64 of heated thermoplastic material. Parison 64 has a generally cylindrical wall 66 which bounds an interior area 68.

Figure 8:
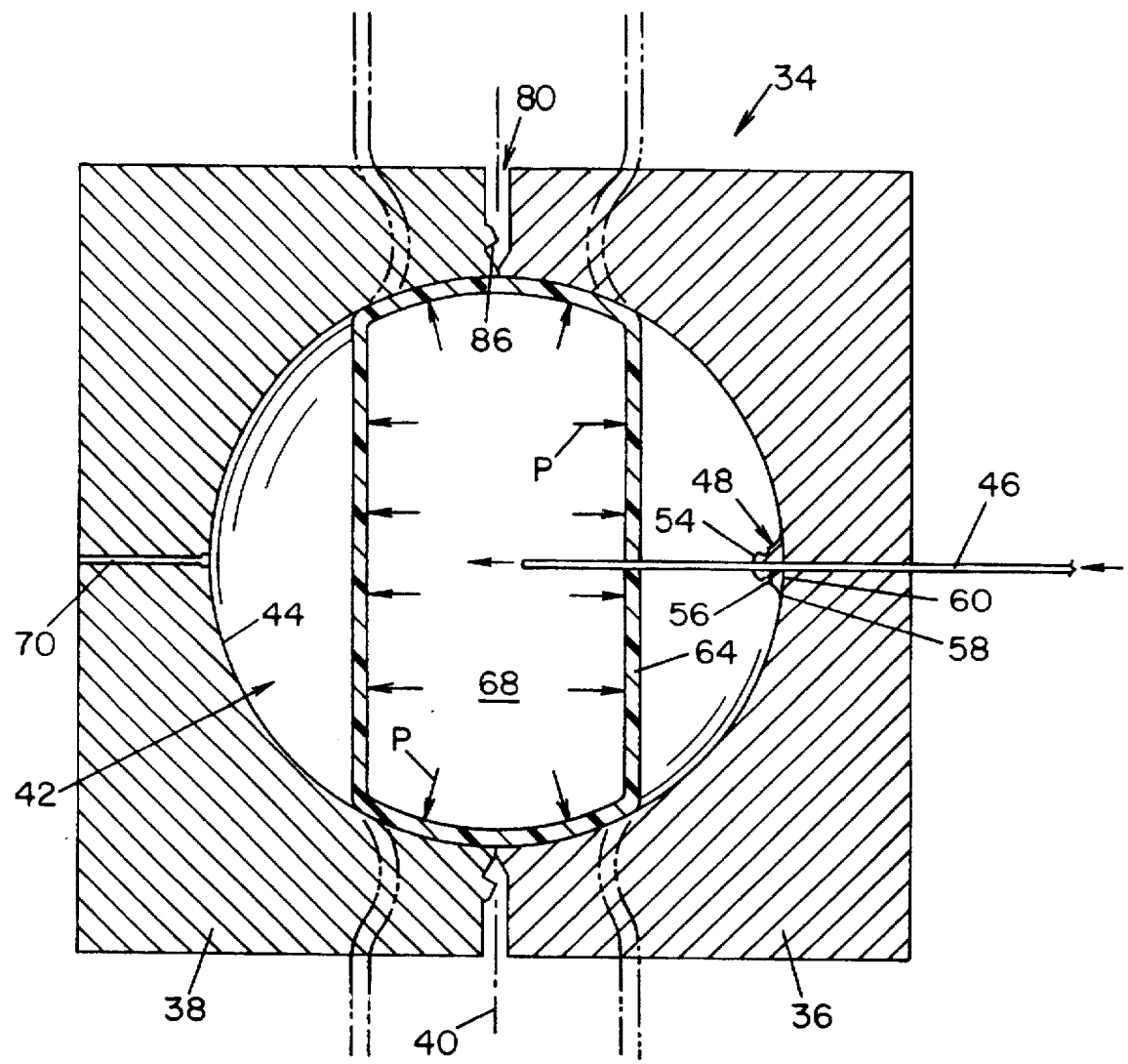
FIG. 8 is a side sectional view showing the mold pieces in FIG. 7 in closed surrounding relation of said parison and the blow needle pressurizing an interior area of said parison.
Figure 9:
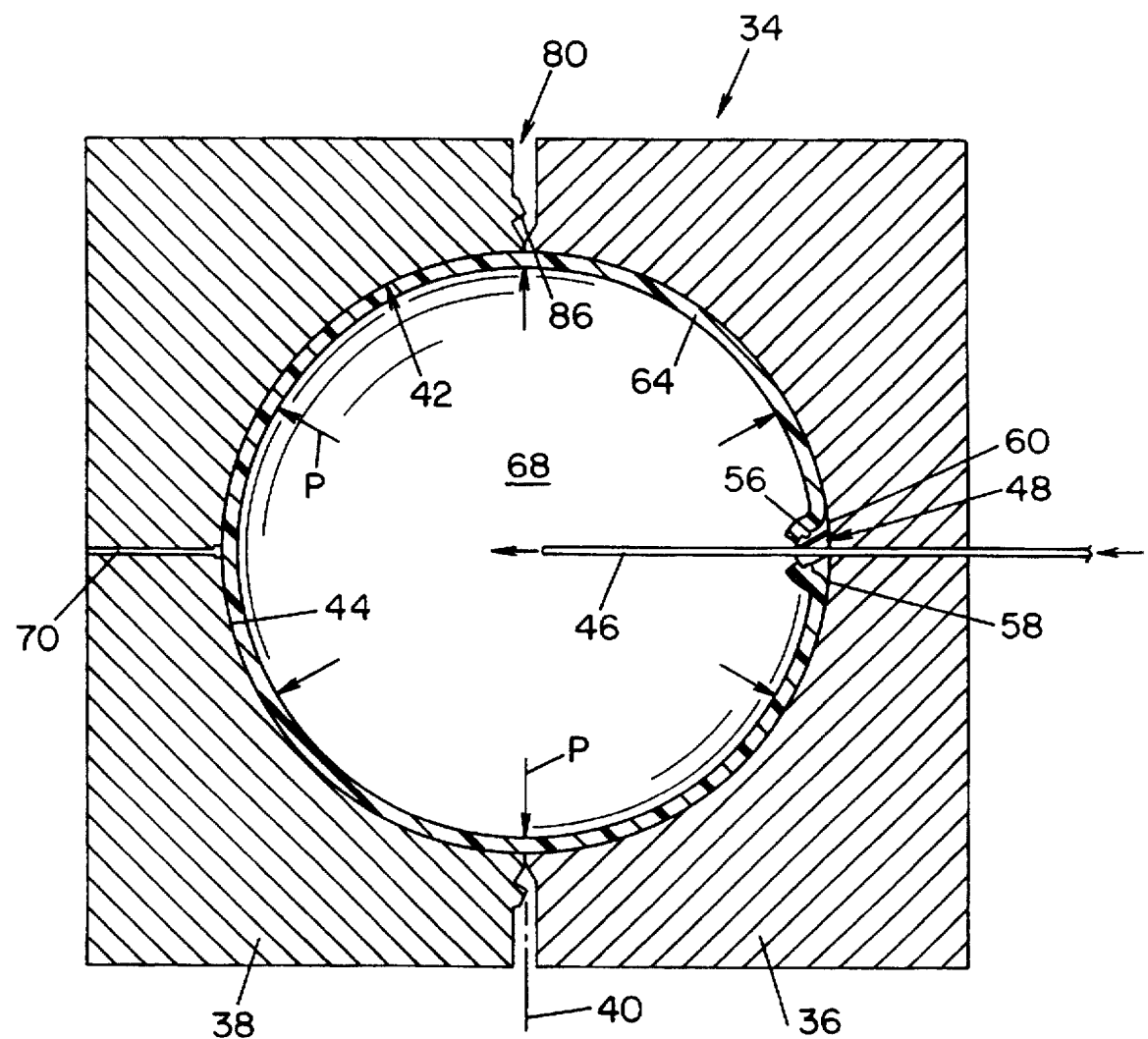
FIG. 9 is a view similar to FIG. 8 wherein the parison has expanded to fill the mold cavity in response to pressure delivered through the blow needle.

In the method of making a ball bladder of the present invention after the parison is extruded, the mold pieces 36 and 38 are closed as shown in FIG. 8. When the mold is closed the mold pieces 36 and 38 engage each other along a circular perimeter, and the parison 64 is pinched off at its upper and lower ends as indicated by the dash lines in FIG. 8. In the preferred embodiment of the invention, the parison 64 is pinched off along the entire circular perimeter.

The blow needle 46 with the valve element 48 supported thereon extends inwardly in the mold cavity 42. In this position an opening in the end of the blow needle extends in the interior area 68 of the parison. The blow needle may be sized to extend sufficiently into the interior area of the parison upon closing of the mold. Alternatively, the blow needle may be moved inwardly in the cavity by a conventional mechanism to extend in the interior area of the parison. With the blow needle extending in the interior area of the parison, fluid pressure, preferably in the form of pressurized air, is then delivered through the blow needle to the interior area. This air pressure, which is represented by the Arrows P, acts on the parison and expands it outwardly. The parison expands so as to impinge against the cavity wall 44 and against the valve element 48. The parison expands until the thermoplastic material assumes the shape of the mold cavity.

It should be mentioned that at least one vent schematically indicated 70, is provided from the mold cavity so as to enable air which may be trapped therein outside the parison to escape from the mold cavity as the parison expands outwardly. Vents 70 are of a conventional variety known in the prior art and are sufficiently small so as to avoid any significant surface irregularity on the finished ball bladder.

As previously discussed, the central passage 50 in the valve element 48 is sufficiently large so that the valve element 48 is movable on the blow needle. As a result, if the blow needle moves inwardly in the mold cavity it may move the valve element 48 inwardly away from the cavity wall. The force of the expanding parison moves the valve element on the blow needle outwardly until the element is in abutting relation with the cavity wall.

The expanding thermoplastic material of the parison impinges on the valve element and engages the protruding portion 54 and the annular recess 56. The thermoplastic material extending in recess 56 as well as engaging the surfaces of the projecting portion and interior face of the annular lip serve to help in adhering the valve element to the remainder of the ball bladder. The valve element is preferably preheated so as to facilitate adhesion to the thermoplastic elastomer of the parison. Preferably the material of the valve element is such that it fuses with the material of the parison as it is expanded. Alternatively, adhesives can be used to facilitate the binding of the valve element to the expanding parison.

In the method of making the ball bladder of the invention the parison is expanded by the differential pressure which results due to the pressure applied through the blow needle until the thermoplastic material fills the mold cavity 42. The aluminum water cooled first mold piece 36 and second mold piece 38 rapidly draw heat from the elastomer when it comes into contact with the mold surface. The material is then allowed to cool in the mold with the pressure from the blow needle 46 still being applied, as is conventional in blow molding.

After the elastomer has cooled sufficiently in the mold so as to solidify, the condition of the valving in connection with the blow needle 46 is changed. The pressure in interior area 68 then exhausts from the mold through the openings in the blow needle. In some embodiments the blow needle 46 may also be retracted somewhat from the center of the mold.

Once the pressure is relieved from the interior area, the mold portions 36 and 38 of mold 34 may be separated. The bladder is then removed from the mold by pulling the valve element 48 off of the blow needle.

In alternative methods of manufacturing the ball bladder, other approaches may be used to produce a differential pressure between the interior area of the parison and the area of the surrounding mold cavity to expand the parison therein. Such alternatives may include drawing a vacuum in the mold cavity outside the parison, so that the higher absolute pressure in the interior area causes the parison to expand. Such alternative methods may also include supporting the valve element in the mold cavity disposed away from the parting line on a structure other than a blow needle, such as in a pocket or on a post.

Figure 12:
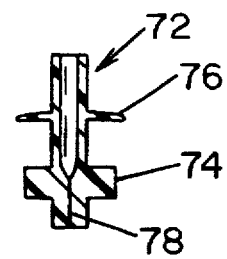
FIG. 12 is a side cross sectional view of a valve member which is designed for insertion in a central passage of the valve element shown in FIG. 11.

After the bladder is expanded in the mold and cooled, the mold pieces are separated. The bladder is then removed from the mold. To complete the manufacture a valve member 72 shown in FIG. 12 is installed in central passage 50 of valve element 48. Valve member 72 includes an enlarged head portion 74 which is positioned in pocket 52 of the central passage. Valve member 72 further includes a radially outwardly extending boss 76. Boss 76 engages outer surface 60 of the valve element when the valve member is installed therein.

Valve member 72 is comprised of resilient material and includes a generally closed slit 78 in the head portion thereof. Slit 78 is generally held in the closed position by the radially inward force of resilient valve element 48 acting thereon. A conventional type valve needle may be extended through slit 78 so as to deliver air through the valve assembly into the interior of the ball bladder. Once the bladder has been inflated to the desired level the valve needle is withdrawn from the slit and the slit recloses to hold pressure in the bladder.

A problem in applying blow molding techniques to the manufacture of ball bladders is that blow molded articles made in accordance with the prior art experience thinning of the wall of the article adjacent to the parting line of the mold. This is a problem in that a thin area is a weak point which in a ball bladder may be a site for tearing, rupture high gas permeability or other failure.

To overcome the problem of thinning of a bladder adjacent to the parting line, the preferred embodiment of Applicants' method for making ball bladders includes pushing thermoplastic material from the parison inwardly into the mold cavity at the parting line as the mold pieces 36 and 38 are closed. The pushing of this additional material into the mold cavity as the mold pieces are closed thickens and strengthens the bladder adjacent to the parting line.

Figure 10:
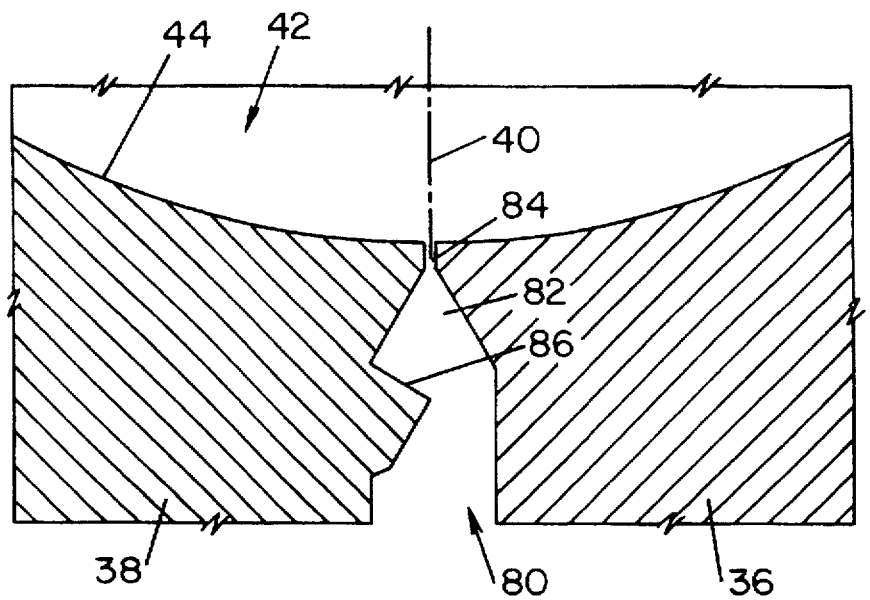
FIG. 10 is an enlarged cross sectional schematic view showing a pinch pocket used in the mold of the preferred embodiment of the invention.

The pushing of additional material into the mold cavity at the parting line is accomplished in the preferred form of the invention by a pinch pocket generally indicated 80 and shown in cross section in FIG. 10. Pinch pocket 80 extends in surrounding relation of the mold cavity 42 adjacent the parting line of the mold. The pinch pocket 80 includes a first portion on mold piece 36 and a second portion on mold piece 38.

Pinch pocket 80 includes in cross section a tapered funnel portion 82 which is connected to a small passage 84 which extends into the mold at the parting line. An angled dam surface 86 extends adjacent to the base of funnel portion 82. Closing of the mold pieces 36 and 38 with parison 64 extending therein pinches off the ends of the parison. As a result, the material pinched off the parison fills the pinch pocket 80. As the mold pieces move towards the adjacent position, the angled dam surface 86 acts to push the fluid thermoplastic material inward through the funnel portion 82, passage 84 and into the mold cavity. As a result, closing the mold results in additional material being pushed into the mold cavity about the circumference of the mold cavity adjacent to the parting line. This thickens the bladder in this region and results in greater strength for the finished bladder.

In the preferred form of the invention, the expanded diameter of the parison is sized generally equal to the final diameter of the finished bladder. By keeping the amount that the parison is expanded by the differential fluid pressure relatively low, more consistent bladder wall thickness is achieved and thin spots are avoided. In the preferred form of the invention the surface area of the wall 66 of the parison that is held within the mold cavity is generally maintained about equal to the surface area of the cavity wall 44.

In the ball bladder and manufacturing method of the present invention the parison may be comprised of any number of thermoplastic elastomer and flexible thermoplastic materials. The valve element is preferably comprised of a material compatible with the material of the parison so as to achieve adhesion thereto upon cooling of the parison in the mold. The use of materials that are fused with the parison during expansion of the parison in the mold avoids the need for significant pre-treatment or secondary steps to achieve a good bond between the parison and the valve element. Of course the surfaces of the valve element, including the annular recess therein, further aids in adhesion.

In one typical example of the invention the parison is comprised of Thermoplastic Elastomer 3201-75W305 material which has a modulus of elasticity less than 25,000 psi which is extruded generally at a temperature somewhat above its melting point of about 400° F. The mold cavity is typically pressurized by the blow needle to a pressure of about 40 PSI which is held therein until the material in the mold is cooled to generally about 180° F. before the pressure therein is relieved.

In this example, the pinch pocket in surrounding relation of the mold cavity is generally about 0.060 inches at the base of the funnel portion. The funnel portion generally extends at an angle of about 30°. The passage from the pinch pocket is generally about 0.010 inches in length and 0.010 inches in width. It should be understood that this is an exemplary embodiment and that other materials, dimensions and process conditions may be used successfully in other embodiments of the invention.

The ball bladders of the present invention are reliably and economically manufactured. Ball bladders of the present invention are resistant to wear, have a very low gas permeability and have less potential for failure compared to ball bladders made in accordance with the splicing method.

Thus the new sports ball bladder and method of manufacture of the present invention achieves the above stated objectives, eliminates difficulties encountered in the use of prior devices, methods and systems, solves problems and attains the desirable results described herein.

In the foregoing description certain terms have been used for brevity, clarity and understanding. However no unnecessary limitations are to be implied therefrom because such terms are for descriptive purposes and are intended to be broadly construed. Moreover the descriptions and illustrations herein are by way of examples and the invention is not limited to the details shown and described.

Further in the following claims, any feature that is described as a means for performing a function shall be construed as encompassing any means capable of performing the recited function and shall not be deemed limited to the particular means shown in the foregoing description or mere equivalents.

Having described the features, discoveries and principles of the invention, the manner in which it is constructed and operated and the advantages and useful results attained; the new and useful structures, devices, elements, arrangements, parts, combinations, systems, equipment, procedures, methods, operations and relationships are set forth in the appended claims.

We claim:

1. A method of making a ball bladder in a mold, wherein said mold has a cavity bounded by a cavity wall defining a shape of said bladder, and wherein said mold comprises at least two separable mold pieces, said mold pieces being separable along a parting line, comprising the steps of:

supporting a valve element in said mold cavity, said valve element being supported at a position disposed away from said parting line;

positioning a generally hollow parison comprised of heated plastic material within said cavity, said parison bounding an interior area;

closing said mold pieces when said parison extends in said cavity;

applying a differential fluid pressure between said interior area of said parison and an area of said cavity surrounding said parison, wherein said parison expands and impinges against said cavity wall and said valve element, whereby said parison assumes said bladder shape;

cooling said expanded parison wherein said parison solidifies having said bladder shape and fuses together with said valve element; and opening said mold pieces, whereby said bladder and the fused valve element are removed together from said mold.

2. The method according to claim 1 wherein said supporting step, said positioning step and said applying step occur simultaneously.

3. The method according to claim 1 wherein said mold pieces are cooled wherein in said cooling step said expanded parison solidifies upon contact with said cavity wall.

4. The method according to claim 1 further comprising the step of: relieving said differential fluid pressure.

5. The method according to claim 1 wherein in said positioning step said parison is extruded.

6. The method according to claim 1 and further comprising the step of pushing said thermoplastic material into said cavity adjacent said parting line.

7. The method according to claim 1 wherein said supporting step comprises supporting said valve element on a blow needle.

8. The method according to claim 7 wherein said pressure applying step comprises extending said blow needle into said interior area of said parison, and applying fluid pressure to said interior area through said blow needle.

9. The method according to claim 7 wherein said valve element includes a central passage therethrough, and wherein in said supporting step said blow needle is extended through said central passage.

10. The method according to claim 9 wherein said valve element is movably supported on said blow needle and wherein in said pressure applying step said expanding parison moves said valve element into abutting relation with said cavity wall.

11. The method according to claim 9 wherein said valve element includes a projecting portion, wherein said projecting portion extends inwardly in said cavity relative to said cavity wall and wherein after said cooling step said expanded parison adheres to said projecting portion.

12. The method according to claim 11 wherein said projecting portion of said valve element includes an annular recess in surrounding relation of said central passage, and wherein in said differential pressure applying step said expanding parison extends in said annular recess.

13. The method according to claim 1 wherein said valve element includes an annular radially outward extending lip, and wherein in said pressure applying step said parison impinges against said annular lip.

14. The method according to claim 8 wherein said pressure relieving step comprises releasing said differential fluid pressure through said blow needle.

15. The method according to claim 6 wherein said pushing step comprises pushing said thermoplastic material into said cavity by pressing a pinch pocket in at least one of said mold pieces.

16. The method according to claim 1 wherein in said positioning step said parison has a parison wall surface area which is generally equal to the surface area of said cavity wall.

17. The method according to claim 1 and after the step of opening said mold pieces further comprising the step of inserting a valve member into said valve element, whereby said valve member enables holding said bladder in an inflated condition.

18. The method according to claim 9 wherein said central passage of said valve element comprises a pocket, and further comprising the step of inserting a valve member into said pocket after the step of opening said mold pieces, whereby said valve member enables holding said bladder in an inflated condition.

19. The method according to claim 1 wherein in said positioning step, said plastic material is a thermoplastic elastomer.

* * * * *